(12) United States Patent
Iwaasa

(10) Patent No.: US 7,562,373 B2
(45) Date of Patent: Jul. 14, 2009

(54) LOCKING MECHANISM FOR PICKUP UNIT OF DISC APPARATUS

(75) Inventor: Hiroaki Iwaasa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 659 days.

(21) Appl. No.: 11/155,163

(22) Filed: Jun. 17, 2005

(65) Prior Publication Data

US 2005/0283789 A1    Dec. 22, 2005

(30) Foreign Application Priority Data

Jun. 21, 2004    (JP) .............................. 2004-182088

(51) Int. Cl.
G11B 7/085 (2006.01)
G11B 17/04 (2006.01)
G11B 33/02 (2006.01)

(52) U.S. Cl. .................. 720/690; 720/605; 720/673
(58) Field of Classification Search ................ 720/605, 720/673, 690
See application file for complete search history.

(56) References Cited

U.S. PATENT DOCUMENTS

| | | | | |
|---|---|---|---|---|
| 4,527,265 A | * | 7/1985 | d'Alayer de Costemore d'Arc | 720/673 |
| 4,941,140 A | * | 7/1990 | Ono et al. | 369/264 |
| 5,123,004 A | | 6/1992 | Arai | |
| 5,444,690 A | * | 8/1995 | Childers, III et al. | 720/673 |
| 5,701,290 A | * | 12/1997 | Okada | 720/673 |
| 5,933,291 A | * | 8/1999 | Kanazawa et al. | 360/99.06 |
| 6,130,874 A | * | 10/2000 | Saito | 720/673 |
| 6,880,159 B2 | * | 4/2005 | Konno et al. | 720/605 |
| 6,959,445 B2 | * | 10/2005 | Mizuno | 720/690 |
| 7,062,774 B2 | * | 6/2006 | Lee | 720/673 |

| | | | |
|---|---|---|---|
| 2001/0030926 A1 | | 10/2001 | Tanaka et al. |
| 2005/0273798 A1 | * | 12/2005 | Chen ....................... 720/690 |

FOREIGN PATENT DOCUMENTS

| | | |
|---|---|---|
| JP | 62-277677 | 12/1987 |
| JP | 9-63212 | 3/1997 |

(Continued)

OTHER PUBLICATIONS

European Search Report for European patent application No. 05013173.9-2210, dated Oct. 5, 2006, 3 pages.

(Continued)

*Primary Examiner*—Brian E Miller
(74) *Attorney, Agent, or Firm*—Osha • Liang LLP

(57) ABSTRACT

A disc apparatus includes a chassis, a drive unit driven by a motor to be moved upward/downward in a prescribed direction, and a pick-up unit having a pick-up and driven by the motor to be moved in a direction orthogonal to the direction of upward/downward movement of the drive unit. The pick-up unit has an interlocking piece, and the chassis has an interlocking portion that can be interlocked with interlocking piece. In the disc apparatus, the interlocking piece provided in the pick-up unit is interlocked with the interlocking portion provided in the chassis when the drive unit is in a lowered state, whereby the pick-up unit is locked into the chassis. Therefore, reduction in the number of components and in the size of the apparatus becomes possible, and the lock mechanism of the pick-up unit can be formed in a simple structure.

3 Claims, 4 Drawing Sheets

FOREIGN PATENT DOCUMENTS

| | | |
|---|---|---|
| JP | 9-106640 | 4/1997 |
| JP | 2000-011511 | 1/2000 |
| JP | 2000-339880 | 12/2000 |
| JP | 2002-329361 | 11/2002 |
| JP | 2003-085855 | 3/2003 |
| JP | 3095688 | 8/2003 |

OTHER PUBLICATIONS

Patent Abstracts of Japan, Publication No. 62277677, Publication Date: Dec. 2, 1987, 1 page.

Patent Abstracts of Japan, Publication No. 09063212, Publication Date: Mar. 7, 1997, 1 page.

Patent Abstracts of Japan, Publication No. 09106640, Publication Date: Apr. 22, 1997, 1 page.

Japanese Office Action for Japanese patent application 2004-182088, mailed Dec. 5, 2006, and English translation thereof, 3 pages.

Patent Abstracts of Japan, Publication No. 2000-339880, Publication Date: Dec. 8, 2000, 1 page.

Patent Abstracts of Japan, Publication No. 2003-085855, Publication Date: Mar. 20, 2003, 1 page.

Patent Abstracts of Japan, Publication No. 2002-329361, Publication Date: Nov. 15, 2002, 1 page.

Patent Abstracts of Japan, Publication No. 2000-011511, Publication Date: Jan. 14, 2000, 1 page.

Partial Translation of Japanese Utility Model Registration No. 3095688, Publication Date: Aug. 15, 2003, 1 page.

* cited by examiner

LOCKING MECHANISM FOR PICKUP UNIT OF DISC APPARATUS

BACKGROUND OF THE INVENTION

1. Field of the Invention

The present invention relates to a disc apparatus for reproducing, recording or erasing a magnetic disc or an optical disc represented, for example, by a DVD (Digital Versatile Disc) (hereinafter simply referred to as a disc) and, more specifically, to a lock mechanism of a pick-up unit mounted on such a disc apparatus.

2. Description of the Background Art

Generally, a disc apparatus includes, in its main body, a disc tray conveying a disc, and a drive unit movable in a direction approximately vertical to the direction of conveying the disc tray. The drive unit includes a pick-up unit having a pick-up for recording or reproduction of the disc, and a motor for moving the pick-up unit along radial direction of the disc.

A transmitting portion including a plurality of gears is provided on the motor, for reducing and transmitting the driving force of the motor. When the transmitting portion meshes with a rack formed in the pick-up unit, the pick-up unit can be moved by the motor.

Further, the transmitting portion can be meshed with an elevating mechanism arranged on the main body of the apparatus. The elevating mechanism is engaged with the drive unit by means of a cam, and movable in the direction of conveying the disc tray and the direction approximately orthogonal to the elevating (up/down) direction of the drive unit. Thus, the drive unit is moved upward/downward. Further, the transmitting portion can be meshed with a rack formed in the disc tray, and at a prescribed timing, the transmitting portion is coupled with the disc tray, so that the driving force of the motor is transmitted to the disc tray.

When a disc is placed on the disc tray in the disc apparatus having the structure described above, the disc tray is conveyed into the disc apparatus by the motor drive. When the disc tray is positioned in place, coupling between the disc tray and the transmitting portion is released, while the elevating mechanism is coupled with the transmitting portion. The elevating mechanism moves in a direction vertical to the conveying direction of the disc tray, so that the drive unit is moved upward. Thus, the disc engages with a chuck portion provided in the drive unit.

After the disc is chucked, coupling between the transmitting portion and the elevating mechanism is released, and the transmitting portion is coupled to the pick-up unit. This allows movement of the pick-up unit along the radial direction of the disc, and therefore, recording or reproduction at a prescribed position of the disc becomes possible. The disc can be taken out by an operation reverse to that described above.

In the disc apparatus having the above-described structure, it becomes necessary to lock, by a lock mechanism, the pick-up unit to prevent movement thereof in a state where the disc tray is drawn forth. By locking the pick-up unit, the start position of the pick-up unit with respect to the motor can be determined. This prevents positional deviation of the pick-up unit by fluctuation of the disc apparatus and hence prevents any resulting malfunction.

The pick-up unit locking mechanisms are disclosed, for example, in Japanese Patent Laying-Open Nos. 2003-085855, 2002-329361 and 2000-011511 as well as in Japanese Utility Model Registration No. 3095688. Among these, Japanese Patent Laying-Open No. 2000-011511 discloses a lock mechanism in which a lever member to be meshed with the pick-up unit when the drive unit is lowered is urged by an elastic body to attain locking of the pick-up unit.

In the disc apparatus disclosed in Japanese Patent Laying-Open No. 2000-011511, however, a lever member and the elastic body are required for locking the pick-up unit, and therefore, the number of components is increased and the apparatus becomes larger. The disc apparatuses disclosed in Japanese Patent Laying-Open Nos. 2003-085855 and 2002-329361 and in Japanese Utility Model Registration No. 3095688 also have the problem that the structure of the apparatus becomes complicated or the number of components increases.

SUMMARY OF THE INVENTION

An object of the present invention is to provide a disc apparatus that enables reduction in the number of components and in the size of the apparatus, in which the lock mechanism for the pick-up unit can be formed in a simple arrangement.

According to a first aspect, the present invention provides a disc apparatus, including: a chassis fixed on a main body of the apparatus; a drive unit supported by the chassis and driven to be moved upward/downward by a motor; and a pick-up unit supported by the drive unit having a pick-up and driven by the motor to be movable in a direction orthogonal to the direction of upward/downward movement of the drive unit. The pick-up unit has an interlocking piece, and the chassis has an interlocking portion capable of interlocking with the interlocking piece. The interlocking piece provided in the pick-up unit is interlocked with the interlocking portion provided in the chassis when the drive unit is in a lowered state, whereby the pick-up unit is locked into the chassis.

In this manner, the mechanism for locking the pick-up unit is implemented by an arrangement in which the pick-up unit and the chassis are interlocked in a state where the drive unit is lowered. Consequently, the lock mechanism can significantly be simplified as compared with the prior art, and the lock mechanism can be formed with a smaller number of components. Therefore, manufacturing cost can considerably be reduced and the apparatus can be made smaller.

In the disc apparatus according to the first aspect described above, preferably, the interlocking piece is formed projected in an L-shape from one end of the pick-up unit along a direction of movement of said pick-up unit. Here, preferably, the interlocking portion is formed by providing, at a portion of the chassis facing the interlocking piece along the direction of movement of the pick-up unit, an L-shaped notch slightly larger than interlocking piece extending along the direction of upward/downward movement of the drive unit.

In this manner, the interlocking piece provided on the pick-up unit is adapted to have an approximately L-shape, and the chassis is provided with an interlocking portion formed as an approximately L-shaped notch to catch the interlocking piece, and therefore, the pick-up unit can be locked and unlocked along with the upward/downward operation of the drive unit. Further, this arrangement realizes a reliable locking operation in a simple structure, and therefore, manufacturing cost can significantly be reduced.

In the disc apparatus according to the first aspect described above, preferably, size of the notch at the interlocking portion along the direction of movement of the pick-up unit is larger at a lower portion than at an upper portion of the interlocking portion. The size of the notch at interlocking portion along the direction of movement of the pick-up unit is made gradually larger toward the lower end of interlocking portion.

Because of this arrangement, when the chassis is formed by injection molding using resin material, the molded chassis can be easily released from the metal mold. Thus, working efficiency improves and the production yield can be increased.

According to a second aspect, the present invention provides a disc apparatus, including: a chassis fixed on a main body of the apparatus; a drive unit supported by the chassis and driven to be moved upward/downward by a motor; and a pick-up unit supported by the drive unit having a pick-up and driven by the motor to be movable in a direction orthogonal to the direction of upward/downward movement of the drive unit. The pick up unit has an interlocking piece formed projected in an L-shape from one end of the pick-up unit along a direction of movement of the pick-up unit; and the chassis has an interlocking portion formed by providing, at a portion of the chassis facing the interlocking piece along the direction of movement of the pick-up unit, an L-shaped notch slightly larger than the interlocking piece extending along the direction of upward/downward movement of the drive unit. The size of the notch at the interlocking portion along the direction of movement of the pick-up unit is larger at a lower portion than at an upper portion of the interlocking portion, and the size of the notch at interlocking portion along the direction of movement of the pick-up unit is made gradually larger toward the lower end of interlocking portion. The interlocking piece provided in the pick-up unit is interlocked with the interlocking portion provided in the chassis when the drive unit is in a lowered state, whereby the pick-up unit is locked into the chassis.

In this manner, the lock mechanism for the pick-up unit is implemented by an arrangement in which the pick-up unit and the chassis are interlocked in a state where the drive unit is lowered. Consequently, the lock mechanism can significantly be simplified as compared with the prior art, and the lock mechanism can be formed with a smaller number of components. Therefore, manufacturing cost can considerably be reduced and the apparatus can be made smaller. In this manner, the interlocking piece provided on the pick-up unit is adapted to have an approximately L-shape, and the chassis is provided with an interlocking portion formed as an approximately L-shaped notch to catch the interlocking piece, and therefore, the pick-up unit can be locked and unlocked along with the upward/downward operation of the drive unit. Further, the size of the notch at a lower portion of the interlocking portion is gradually changed to be larger toward the lower end of the interlocking portion, and therefore, when the chassis is formed by injection molding using resin material, the molded chassis can be easily released from the metal mold. Thus, working efficiency improves and the production yield can be increased.

The present invention realizes reduction in the number of components and in the size of the apparatus, and provides the lock mechanism for a pick-up unit having a simple structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described with reference to the figures.

Figure 1:
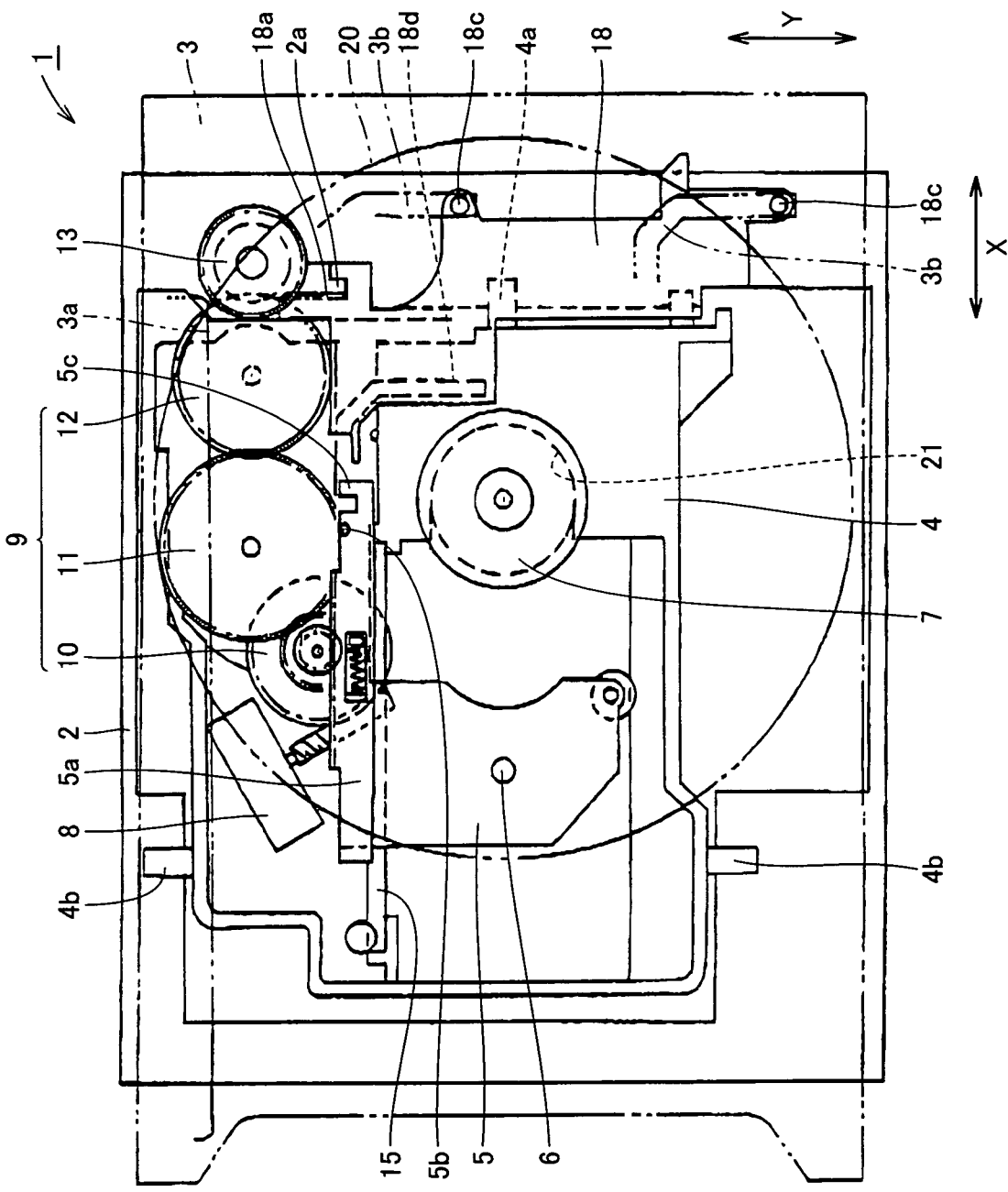
FIG. 1 is a plan view showing an internal arrangement of a disc apparatus in accordance with an embodiment of the present invention.
Figure 2:
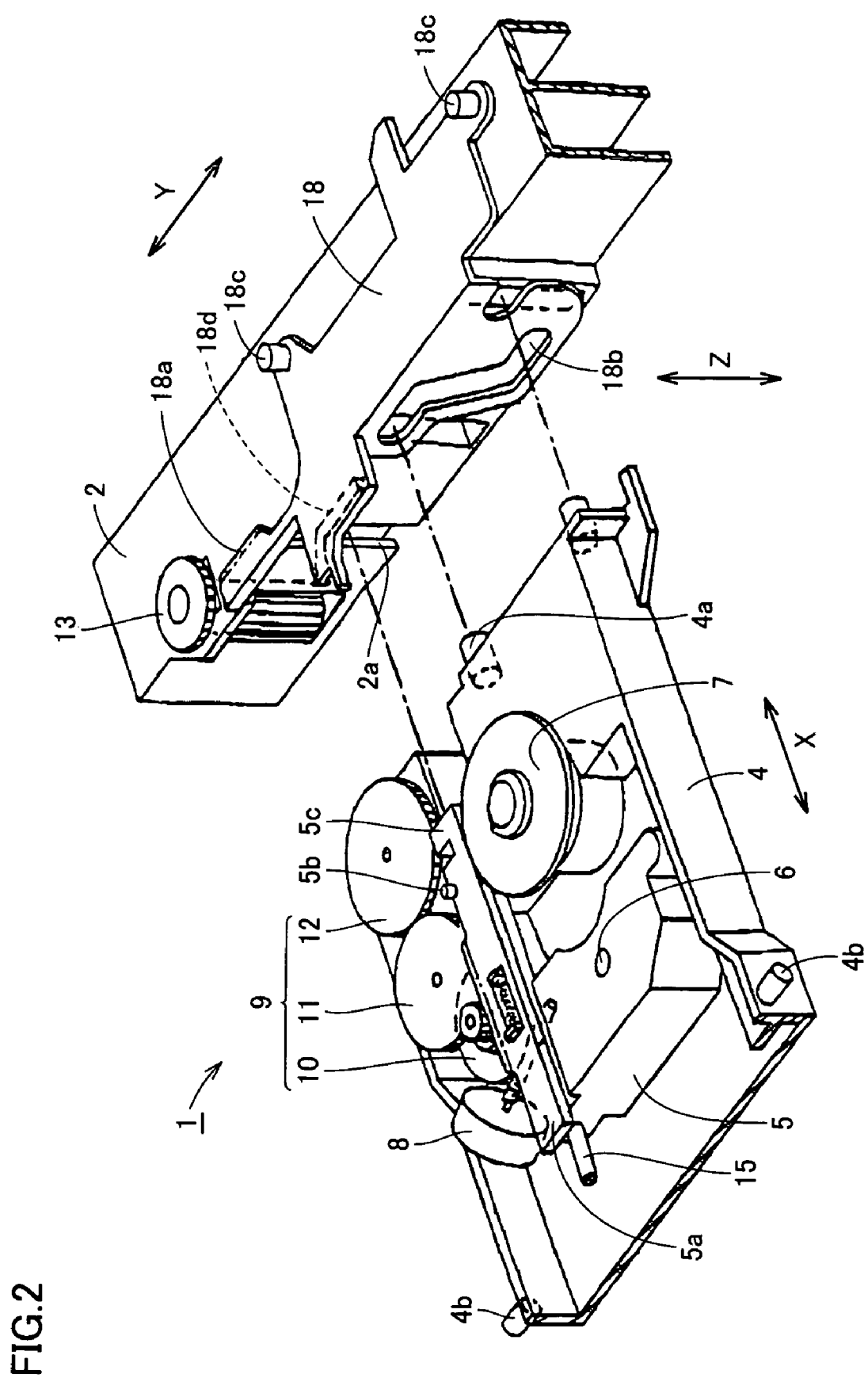
FIG. 2 is an exploded perspective view showing a main portion of the disc apparatus of FIG. 1.

Referring to FIGS. 1 and 2, a disc apparatus 1 in accordance with the present embodiment has a chassis 2. A disc tray 3 and a drive unit 4 are mounted on chassis 2. Disc tray 3 is movably supported by chassis 2, and movable in the direction of an arrow X in the figures. On a pair of side surfaces of drive unit 4, pins 4b are provided, respectively, which pins 4b are pivotally supported by a bearing portion formed in chassis 2. Therefore, drive unit 4 is supported by chassis 2 to be movable upward/downward about pins 4b as axes, and it can be moved upward/downward in the direction of an arrow Z in the figure (in the direction vertical to the sheet surface in FIG. 1).

A turntable 7 as a chucking portion is fixed on drive unit 4. As drive unit 4 moves upward/downward, turntable 7 is engaged with/disengaged from a hole portion 21 of a disc 20 placed on disc tray 3. In this manner, disc 20 is chucked by turntable 7 or chucked disc 20 is released.

On drive unit 4, a pick-up unit 5 having a pick-up 6 fixed thereon is mounted, on a centerline of turntable 7. Pick-up unit 5 is supported, movable in the direction of the arrow X in the figure, by a guide shaft 15 provided in drive unit 4. Pick-up 6 is a device emitting a laser beam to information recording tracks of disc 20 to realize reproduction or recording of disc 20.

By the side of pick-up unit 5, a motor 8 and a transmitting portion 9 including a plurality of gears 10, 11 and 12 transmitting the driving force of motor 8 are arranged. Gear 10 as a part of transmitting portion 9 is arranged to be meshed with a rack 5a formed in pick-up unit 5. Thus, by the driving force of motor 8, pick-up unit 5 moves in the direction of the arrow X. Gear 12 as a part of transmitting portion 9 is coupled with a tray gear 13 attached to chassis 2. Tray gear 13 is arranged to be meshed with a rack 3a formed in disc tray 3. Thus, by the driving force of motor 8, disc tray 3 moves in the direction of the arrow X.

A cam slider 18 as an elevating mechanism is mounted movable in the direction of the arrow Y in the figure, on chassis 2. Cam slider 18 has a rack 18a that can be meshed with tray gear 13, a cam groove 18b to be engaged with a boss 4a formed in drive unit 4, a cam projection 18c to be engaged with a cam groove 3b formed on a lower surface of disc tray 3, and a cam groove 18d to be engaged with a cam projection 5b provided in pick-up unit 5.

Cam slider 18 moves in the direction of the arrow Y in the figure by the driving force of motor 8, as rack 18a meshes with tray gear 13. Further, cam slider 18 moves in the direction of the arrow Y along with the movement of disc tray 3 in the direction of the arrow X, as cam projection 18c engages with cam groove 3b provided in disc tray 3.

Drive unit 4 moves upward/downward in the direction of the arrow Z, along with the movement of cam slider 18 in the direction of the arrow Y, as boss 4a engages with cam groove 18b formed in cam slider 18. Further, pick-up unit 5 moves in the direction of the arrow X along with the movement of cam slider 18 in the direction of the arrow Y in the figure, as cam projection 5*b* engages with cam groove 18*d* formed in cam slider 18.

An L-shaped interlocking piece 5*c* is formed, projected from a tip end of pick-up unit 5 on the side of cam slider 18. On a portion of chassis 2 facing the interlocking piece 5*c* in the direction of movement of pick-up unit 5, an L-shaped notch slightly larger than interlocking piece 5*c* is provided, extending along the direction of upward/downward movement of drive unit 4. Namely, chassis 2 has an interlocking portion 2*a* having an L-shaped notch.

Interlocking portion 2*a* is formed to be interlocked with interlocking piece 5*c*. Interlocking piece 5*c* and interlocking portion 2*a* are interlocked when drive unit 4 is in a lowered state, and the interlock is released when drive unit 4 is in an elevated state. Specifically, only when the drive unit 4 is in the lowered state, pick-up unit 5 is locked into chassis 2, to prevent movement of pick-up unit 5.

The operations of disc apparatus 1 and the lock mechanism having the structures above will be described in detail with reference to FIGS. 1, 2 and 3A to 3C.

When motor 8 is operated, gears 10, 11 and 12 forming transmitting portion 9 for transmitting the driving force of motor 8 and a tray gear 13 are rotated. When disc tray 3 is contained in the main body of disc apparatus 1, gear 10 is meshed with rack 5*a* of pick-up unit 5, and therefore, by the forward/backward rotation of motor 8, pick-up unit 5 moves reciprocally in the radial direction (the direction in the arrow X), and pick-up 6 is arranged in place.

At this time, cam slider 18 is arranged in a lower position (in a direction away from tray gear 13), and drive unit 4 is arranged at an elevated position by the engagement of cam groove 18*b* and boss 4*a*. Thus, disc 20 is chucked by turntable 7. In this state, tray gear 13 and rack 3*a* provided in disc tray 3 are disengaged from each other, and tray gear 13 and rack 18*a* provided in cam slider 18 are disengaged from each other.

Figure 3A:
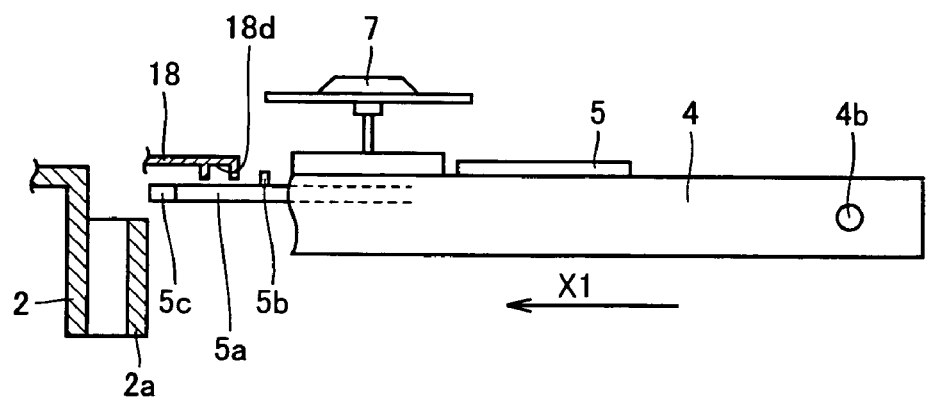
FIGS. 3A, 3B and 3C are schematic sectional views illustrating the arrangement and operation of the mechanism for locking the pick-up unit in the disc apparatus in accordance with an embodiment of the present invention.
Figure 3B:
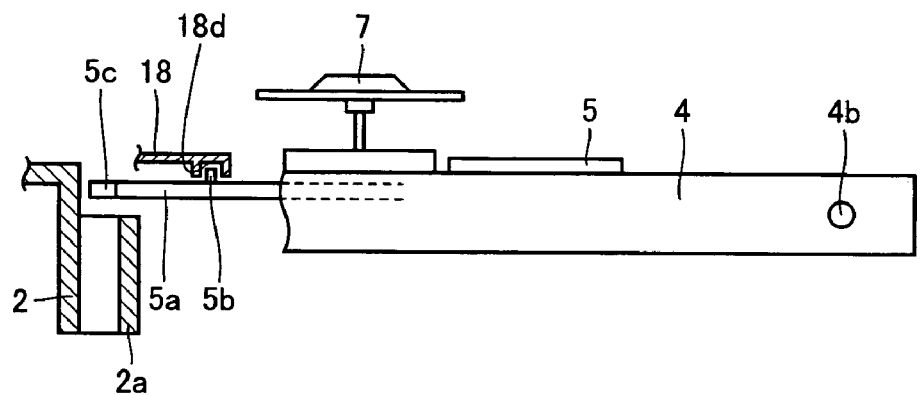

When disc 20 is to be unloaded (when disc tray 2 is drawn out from the apparatus), referring to FIGS. 1 and 3A, an eject button (not shown) is pressed, so that motor 8 operates to rotate gear 10, and pick-up unit 5 moves toward cam slider 18 (in the direction of the arrow X1 in FIG. 3A). By this movement, cam projection 5*c* provided in pick-up unit 5 comes to be meshed with cam groove 18*d* provided in cam slider 18 (see FIG. 3B). As cam groove 18*d* meshes with cam projection 5*c*, cam slider 18 moves upward (toward tray gear 13) in FIG. 1, guided by cam projection 5*c*. Thus, rack 18*a* of cam slider 18 comes to be meshed with tray gear 13.

When cam slider 18 is further moved by tray gear 13, drive unit 4 lowers guided by cam groove 18*b* formed in cam slider 18. As drive unit 4 lowers in this manner, chuck of disc 20 by turntable 7 is released.

Figure 3C:
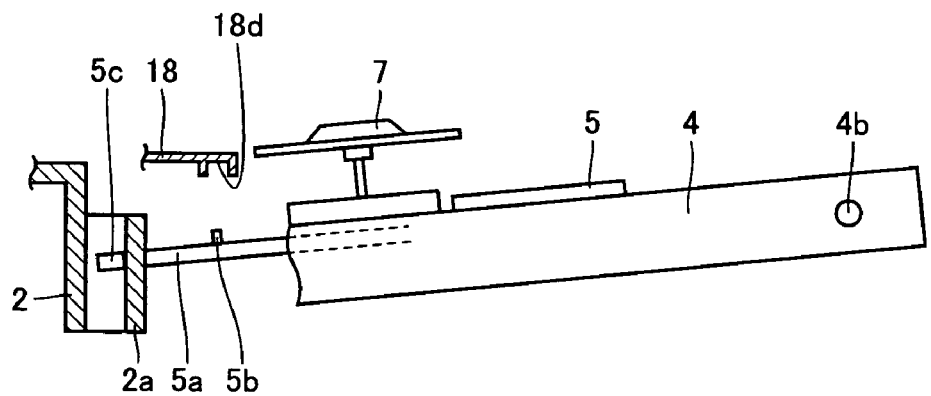

Here, interlocking piece 5*c* provided on pick-up unit 5 proceeds into the notch at interlocking portion 2*a* formed in chassis 2 as shown in FIG. 3C, attaining interlock between interlocking piece 5*c* and interlocking portion 2*a*. Consequently, pick-up unit 5 is locked into chassis 2, and its movement is limited. Thus, positional deviation of pick-up unit 5 can be prevented.

At the same time, as cam projection 18*c* of cam slider 18 meshes with cam groove 3*b* of disc tray 3, disc tray 3 is slightly drawn forth. Thus, tray gear 13 meshes with rack 3*a* of disc tray 3, and by tray gear 13, disc tray 3 is drawn out to the position of loading/unloading.

When disc 20 is to be loaded (when the disc tray is to be contained in the main body of the apparatus), an eject button (not shown) is pressed, so that motor 8 rotates, and by the operation reverse to that of the unloading operation described above, disc tray 3 is drawn into the main body of the apparatus, and disc 20 is chucked by turn table 7.

By the adoption of the arrangement described above, the lock mechanism can be significantly simplified as compared with the prior art, and the lock mechanism can be formed with a smaller number of components. Therefore, manufacturing cost can considerably be reduced and the apparatus can be made smaller. Further, the pick-up unit can be locked and unlocked along with the upward/downward operation of the drive unit, and therefore, the pick-up unit can reliably be locked. As a result, the start position of the pick-up unit with respect to the motor can be determined. This prevents positional deviation of the pick-up unit by fluctuation of the disc apparatus and hence prevents any resulting malfunction.

Figure 4A:
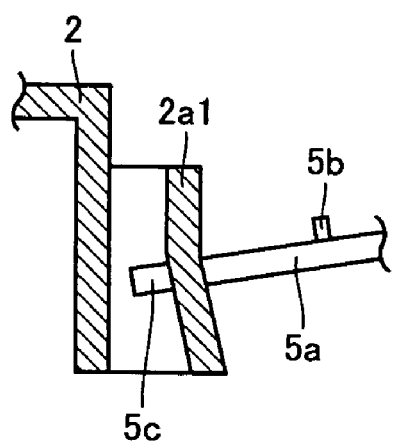
FIGS. 4A and 4B are schematic sectional views illustrating suitable examples of the interlocking portion formed in the chassis in the disc apparatus in accordance with an embodiment of the present invention.

In the following, suitable shapes of the interlocking portion formed in the chassis will be described. In a modification shown in FIG. 4A, the lower portion of interlocking portion 2*a*1 is tapered, and the size of notch at interlocking portion 2*a*1 along the direction of movement of pick-up unit 5 is made larger at a lower portion than at an upper portion. The size of notch at interlocking portion 2*a*1 along the direction of movement of pick-up unit 5 is made gradually larger toward the lower end of interlocking portion 2*a*1.

Figure 4B:
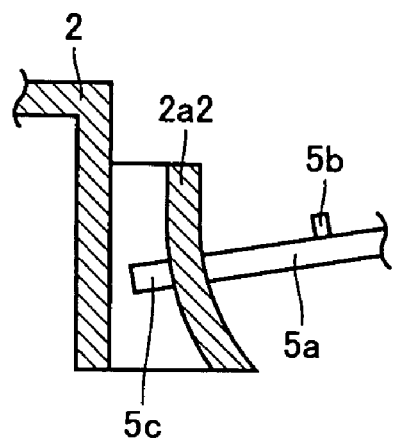

In another modification shown in FIG. 4B, the lower portion of interlocking portion 2*a*2 is curved, and size of notch at interlocking portion 2*a*2 along the direction of movement of pick-up unit 5 is made larger at a lower portion than at an upper portion. The size of notch at interlocking portion 2*a*2 along the direction of movement of pick-up unit 5 is made gradually larger toward the lower end of interlocking portion 2*a*2.

It is a common practice to form chassis 2 by injection molding, using resin material. Therefore, when interlocking portion 2*a*1 or 2*a*2 is formed in the above-described manner, it becomes possible to release the molded chassis easily from the metal mold. Thus, working efficiency improves and the production yield can be increased.

In the embodiment above, a tray type disc apparatus having a disc tray has been described as an example. The present invention, however, is also applicable to a slot-in type disc apparatus not having a disc tray.

Further, the present invention is applicable to any type of disc apparatus used for disc-shaped recording medium, including a CD, CD-ROM (Compact Disc-Read-Only Memory), CD-R (Compact Disc-Recordable), CD-RW (Compact Disc-Rewritable), DVD, DVD-ROM (Digital Versatile Disc-Read Only Memory), DVD-R (Digital Versatile Disc-Recordable) and DVD-RW (Digital Versatile Disc-Rewritable). Further, the present invention is naturally applicable not only to an external disc apparatus provided as a single body but also to a disc apparatus incorporated as an assembly in another apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc apparatus, comprising:
   a chassis fixed on a main body of the disc apparatus, wherein said chassis has a vertical wall;
   a drive unit supported by said chassis and driven to be moved upward/downward by a motor; and
   a pick-up unit supported by said drive unit having a pick-up and driven by said motor to be movable in a direction orthogonal to the direction of upward/downward movement of said drive unit; wherein said pick up unit has an interlocking piece that is projected from one end of said pick-up unit along the direction orthogonal to the direction of upward/downward movement of said drive unit;

said interlocking piece has an L-shape;

said chassis has an interlocking portion formed by providing, at a portion of said chassis facing said interlocking piece, an L-shaped notch that is slightly larger than said interlocking piece and that extends along the direction of upward/downward movement of said drive unit; and the interlocking portion is tapered such that a space between the interlocking portion and the vertical wall of the chassis gradually increases downward toward a lower portion of the interlocking portion.

2. A disc apparatus comprising:

a chassis fixed on a main body of the disk apparatus, wherein said chassis has a vertical wall;

a drive unit supported by said chassis and driven to be moved upward/downward by a motor;

a pick-up unit supported by said drive unit having a pick-up and driven by said motor to be movable in a direction orthogonal to the direction of upward/downward movement of said drive unit; wherein said pick-up unit has an interlocking piece;

said chassis has an interlocking portion capable of interlocking with said interlocking piece;

the interlocking piece provided in said pick-up unit is interlocked with the interlocking portion provided in said chassis when said drive unit is in a lowered state, whereby said pick-up unit is locked into said chassis;

the interlocking portion is tapered such that a space between the interlocking portion and said vertical wall of the chassis gradually increases downward toward a lower portion of the interlocking portion;

said interlocking piece is projected from one end of said pick-up unit along the direction orthogonal to the direction of upward/downward movement of said drive unit;

said interlocking piece has an L-shape; and said interlocking portion is formed by providing, at a portion of said chassis facing said interlocking piece, an L-shaped notch that is slightly larger than said interlocking piece and that extends along the direction of upward/downward movement of said drive unit.

3. The disc apparatus according to claim 2, wherein the interlocking portion is curved in shape.

* * * * *